(12) United States Patent
Pitre

(10) Patent No.: US 11,073,131 B2
(45) Date of Patent: *Jul. 27, 2021

(54) FOLDING BLADE WIND TURBINE

(71) Applicant: Natural Power Concepts, Inc., Honolulu, HI (US)

(72) Inventor: John Pitre, Honolulu, HI (US)

(73) Assignee: Natural Power Concepts, Inc., Honolulu, HI (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/259,276

(22) Filed: Jan. 28, 2019

(65) Prior Publication Data

US 2019/0226452 A1 Jul. 25, 2019

Related U.S. Application Data

(63) Continuation of application No. 14/558,991, filed on Dec. 3, 2014, now Pat. No. 10,215,158.

(Continued)

(51) Int. Cl.
*F03D 7/02* (2006.01)
*F03D 1/06* (2006.01)

(52) U.S. Cl.
CPC ......... *F03D 7/0236* (2013.01); *F03D 1/0658* (2013.01); *F03D 7/0268* (2013.01); *F05B 2240/2022* (2013.01); *Y02E 10/72* (2013.01)

(58) Field of Classification Search
None
See application file for complete search history.

(56) References Cited

U.S. PATENT DOCUMENTS

| | | | | |
|---|---|---|---|---|
| 2,086,279 A | * | 7/1937 | McDonald, Jr. | ........ F03D 7/026 290/44 |
| 4,565,929 A | * | 1/1986 | Baskin | ................. F03D 1/0658 290/44 |

(Continued)

*Primary Examiner* — Michael Lebentritt
*Assistant Examiner* — Jason G Davis
(74) *Attorney, Agent, or Firm* — Polsinelli PC

(57) ABSTRACT

A wind turbine is provided. The turbine includes a support having an axis of rotation, a generator, a plurality of blades rotatably mounted on the support about the axis of rotation, the blades being moveable between a retracted position generally parallel with the axis of rotation and a fully deployed position generally perpendicular with the axis of rotation, the blades being connected to the generator such that rotation of the blades in a direction induced by wind causes the generator to produce electricity, and the provision of electricity to the generator rotates the blades, and a controller connected to the generator and configured to deliver a flow of current to the generator that is sufficient to move the blades from the retracted position toward the fully deployed position and insufficient to move the blades all the way to the fully deployed position. The flow of current induces rotation of the blades in the direction induced by wind, which creates a centrifugal force that moves the blades from the retracted position toward the fully deployed position. As the blades move from the retracted position, the blades have increasing exposure to ambient wind to receive additional rotational force from ambient wind, and the additional rotational force being sufficient to, either alone or in combination with the flow of current, move the blades into the fully deployed position.

19 Claims, 10 Drawing Sheets

Related U.S. Application Data

(60) Provisional application No. 61/911,000, filed on Dec. 3, 2013.

(56) References Cited

U.S. PATENT DOCUMENTS

| | | | |
|---|---|---|---|
| 8,753,080 B2 * | 6/2014 | Morimoto | F03D 7/0268 416/1 |
| 8,915,697 B2 * | 12/2014 | Pitre | F03D 13/40 415/1 |
| 2005/0196281 A1 * | 9/2005 | Kim | F03D 15/10 416/132 B |
| 2011/0211957 A1 * | 9/2011 | Folsom | F03D 1/0658 416/41 |

* cited by examiner

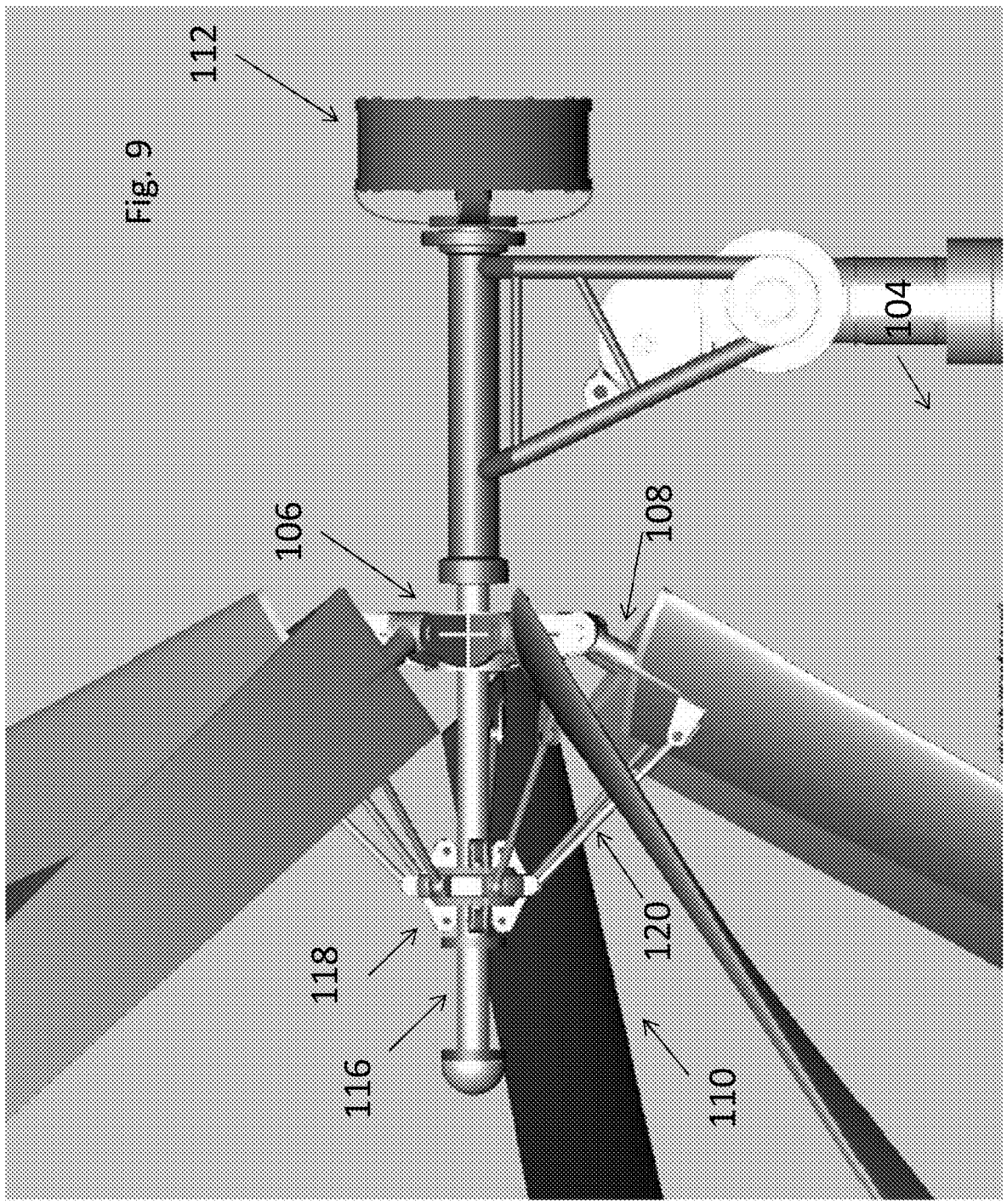

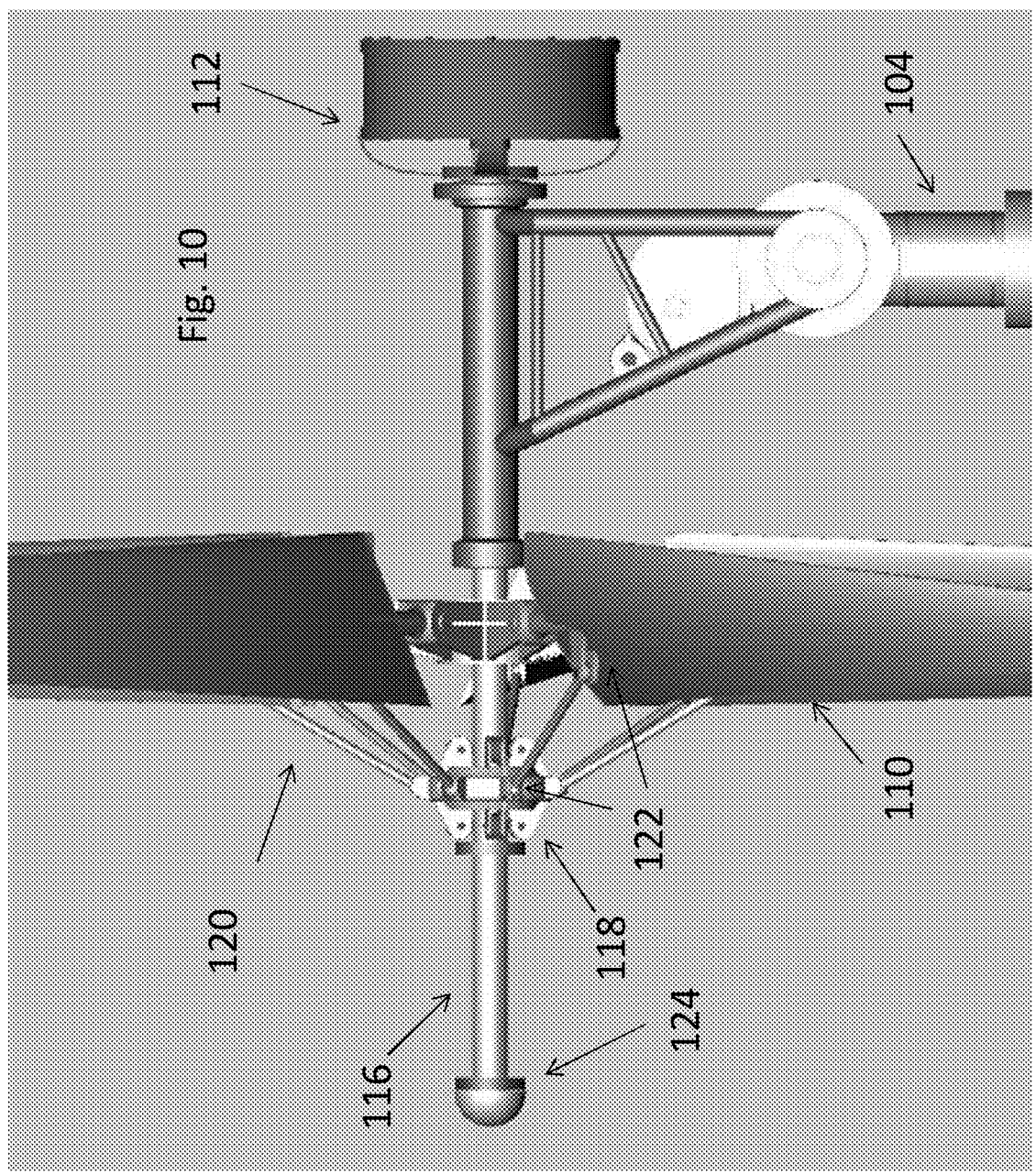

FOLDING BLADE WIND TURBINE

CROSS REFERENCE TO RELATED APPLICATIONS

The instant application is a continuation of, and claims priority to, U.S. patent application Ser. No. 14/558,991 entitled FOLDING BLADE WIND TURBINE, filed Dec. 3, 2014, which claims priority to U.S. patent application Ser. No. 61/911,000, filed Dec. 3, 2013, entitled Folding Blade Wind Turbine. The instant application also relates to U.S. patent application Ser. No. 12/461,716 filed Aug. 21, 2009 and Ser. No. 12/461,575 filed Aug. 17, 2009. The contents of the foregoing applications are expressly incorporated herein by reference in their entireties.

FIELD OF THE INVENTION

Various embodiments described herein relate generally to deployment and retraction of wind turbine blades. More particularly, various embodiments described herein relate to retraction and deployment of wind turbine blades using a combination of electrically induced rotation and wind induced rotation.

BACKGROUND

Modern, wind-driven electricity generators were born in the late 1970's. Until the early 1970s, wind energy filled a small niche market supplying mechanical power for grinding grain and pumping water, as well as electricity for rural battery charging. With the exception of battery chargers and rare experiments with larger electricity-producing machines, the windmills of 1850 and even 1950 differed very little from the primitive devices from which they were derived. As of July 2008, wind energy provides approximately 1% of total U.S. electricity generation. Smaller designs with as many as 30 blades are common for irrigation in farming.

Most modern wind turbines typically have 3-bladed rotors 10 with diameters of 10-80 meters mounted atop 60-80 meter towers 12. The average turbine installed in the United States in 2006 can produce approximately 1.6 megawatts of electrical power. Turbine power output is controlled by rotating the blades around their long axis to change the angle of attack (pitch) with respect to the relative wind as the blades spin around the rotor hub. The turbine is pointed into the wind by rotating the nacelle around the tower (yaw). Turbines are typically installed in arrays (farms) of 30-150 machines. A pitch controller (for blade pitch) regulates the power output and rotor speed to prevent overloading the structural components—during unusually strong wind conditions. Generally, a turbine will start producing power in winds of about 5.36 meters/second and reach maximum power output at about 12.52-13.41 meters/second (28-30 miles per hour). The turbine will pitch or feather the blades to stop power production and rotation at about 22.35 meters/second (50 miles per hour).

Efforts have been made to provide mechanisms to transition the blades from the open deployed position, in which the blades are generally parallel to the mast and radially about the rotating hub, to the closed retracted position (folded back) in which the blades are generally perpendicular to the mast in a tight cluster. This allows for reducing the surface area in high wind environments, as well as for storage and ease of transport. U.S. patent application Ser. Nos. 12/461,716 and 12/461,575 incorporated herein both disclose designs for opening and closing the blades.

SUMMARY OF THE INVENTION

According to an embodiment of the invention, a wind turbine is provided. The turbine includes a support having an axis of rotation, a generator, a plurality of blades rotatably mounted on the support about the axis of rotation, the blades being moveable between a retracted position generally parallel with the axis of rotation and a fully deployed position generally perpendicular with the axis of rotation, the blades being connected to the generator such that rotation of the blades in a direction induced by wind causes the generator to produce electricity, and the provision of electricity to the generator motor rotates the blades, and a controller connected to the generator and configured to deliver a flow of current to the generator motor that is sufficient to rotate the folded blades and move the blades from the retracted position toward the fully deployed position and insufficient to move the blades all the way to the fully deployed position. The flow of current induces rotation of the blades in the direction induced by wind, which creates a centrifugal force that moves the blades from the retracted position toward the fully deployed position. As the blades move from the retracted position, the blades have increasing exposure to ambient wind to receive additional rotational force from ambient wind, and the additional rotational force being sufficient to, either alone or in combination with the flow of current, move the blades into the fully deployed position.

BRIEF DESCRIPTION OF THE DRAWINGS

Various embodiments in accordance with the present disclosure will be described with reference to the drawings, in which:

FIG. 9 illustrates a side view of an embodiment of the invention in a partially deployed position.

FIG. 10 illustrates a side view of an embodiment of the invention in an ideally fully deployed position.

DETAILED DESCRIPTION

Figure 1:
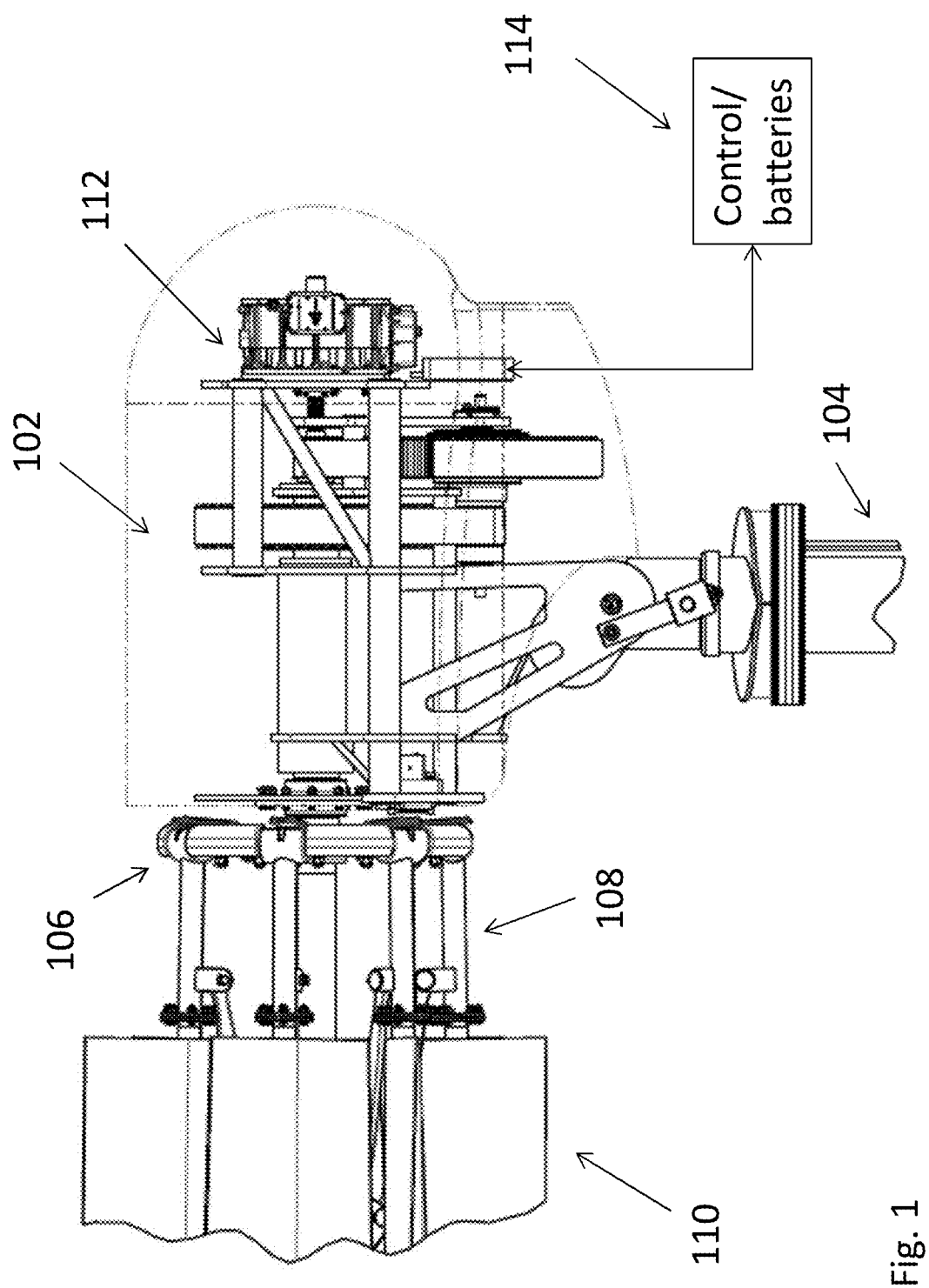
FIG. 1 illustrates a side view of an embodiment of the invention in a closed position.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

The blade configuration is shown in the attached figures. A generally vertical mast supports the turbine. Multiple turbine blades are pivotally mounted at their root to a support hub on a nacelle. The pivot allows the blades to move between the fully deployed/open position, and collapse to a fully closed/retracted position. The blades can also take partial deployment positions between the deployed and retracted positions.

The fully deployed position in the figures shows the blades as vertical, although in practice the nature of the embodiment may have some small angle off vertical on the order 0-15 degrees. In this context, any use of "horizontal" or "vertical" herein is understood to be modified by "generally" to account for such variances from absolute perfection in position.

The turbine is generally rotatable about the mast to orient into the direction of the prevalent winds. The turbine referenced herein is preferably a downwind turbine, in that the blades are oriented toward the rear of the turbine downwind of the hub and nacelle (relative to the wind).

The support hub is connected to a generator/motor (hereinafter simply "generator") that is configured to generate electricity, such as a permanent magnet motor. Rotation of the blades causes rotation in the generator, which generates electricity in a known manner. Various elements that interconnect the support hub to the permanent magnet motor are well known in the wind turbine art and are thus not shown herein.

A slideable track ring is located on the shaft rearward of the support hub. The track ring pivotally supports several connecting rods that pivotally connect to the blades. The individual connecting rods maintains a common angle for the deployment of the individual blades, such that the blades have the same position relative to each other regardless of deployment position.

When in the fully deployed position, the track ring is in its most forward position and closest to the support hub. As the blades begin to close, the track ring will move rearward. The fully closed position will bring the track ring (or some stop connected thereto) proximate to an end or stop on the shaft. Preferably some of the components in the track ring and/or end of the shaft will have magnetic material therein to establish a weak magnetic lock for the closed position to prevent low grade shifting of the components. This can also be achieved with a spring-loaded mechanical sliding or rolling catch device.

Figure 2:
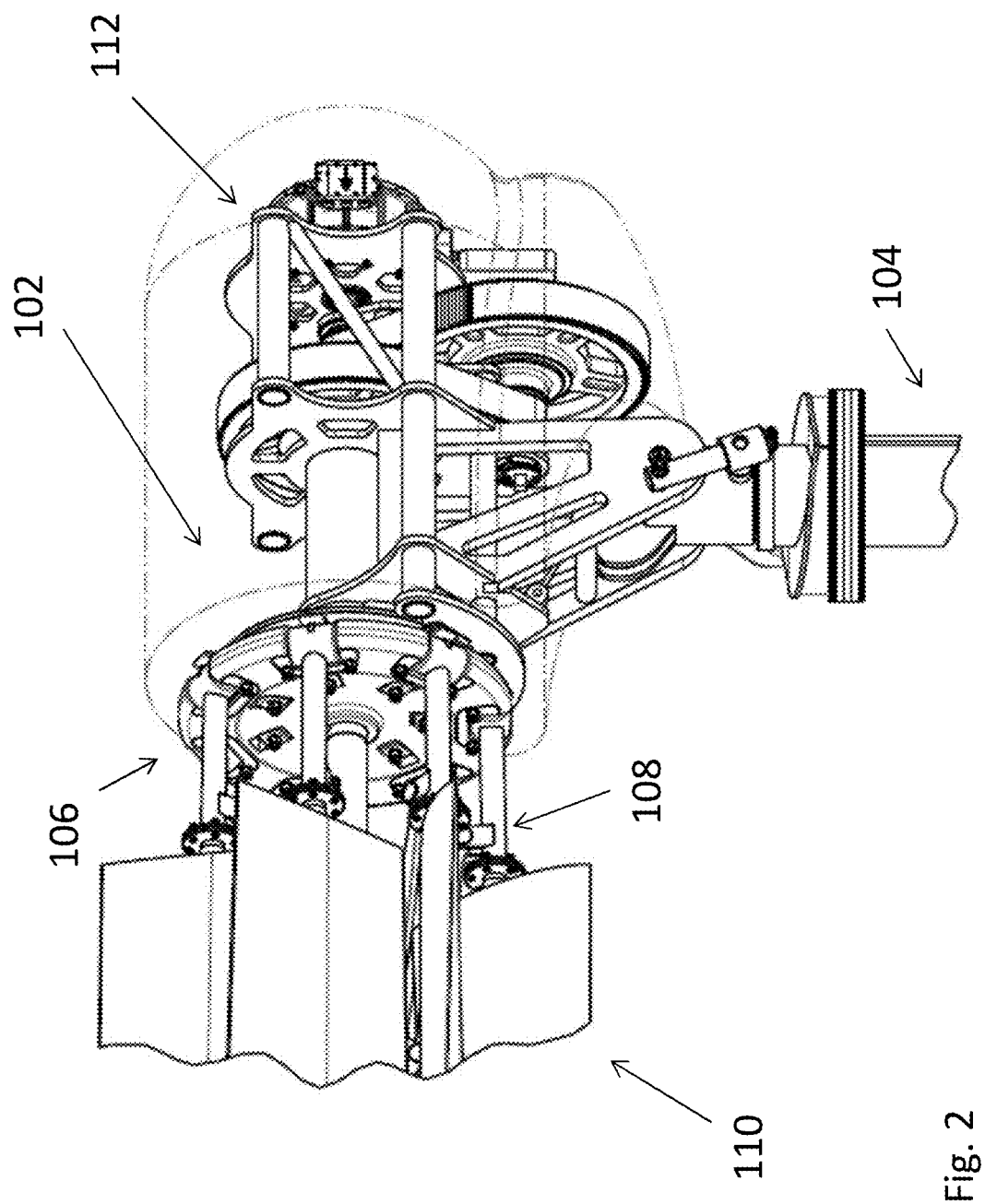
FIG. 2 illustrates a perspective view of an embodiment of the invention in a closed position.

A non-limiting example of the above referred to architecture is shown in FIGS. 1-6. Referring now to FIGS. 1 and 2, a nacelle 102 is supported atop a mast 104. Nacelle 102 has a rotating axis that extends toward a support hub 106. Turbine blades 110 have shafts 108 that are mounted pivotally to support hub 106. In FIGS. 1 and 2 blades 110 are in the retracted position, although they can rotate about the pivot connection to support hub 106 into other positions as discussed below.

Nacelle 102 includes a generator 112. Generator 112 generates electricity in response to wind induced rotation of blades 110, which it forwards to downstream equipment shown generically by controller/batteries 114 (although the functions of the downstream equipment is not necessarily limited to a controller and/or batteries). Generator 112 also acts as a motor to drive rotation of blades 110. The overall architecture of the interior of nacelle 102 is consistent with knowledge of skill in the art and is not further discussed herein. Generator 112 may include a mechanical brake to slow rotation as discussed below.

Figure 3:
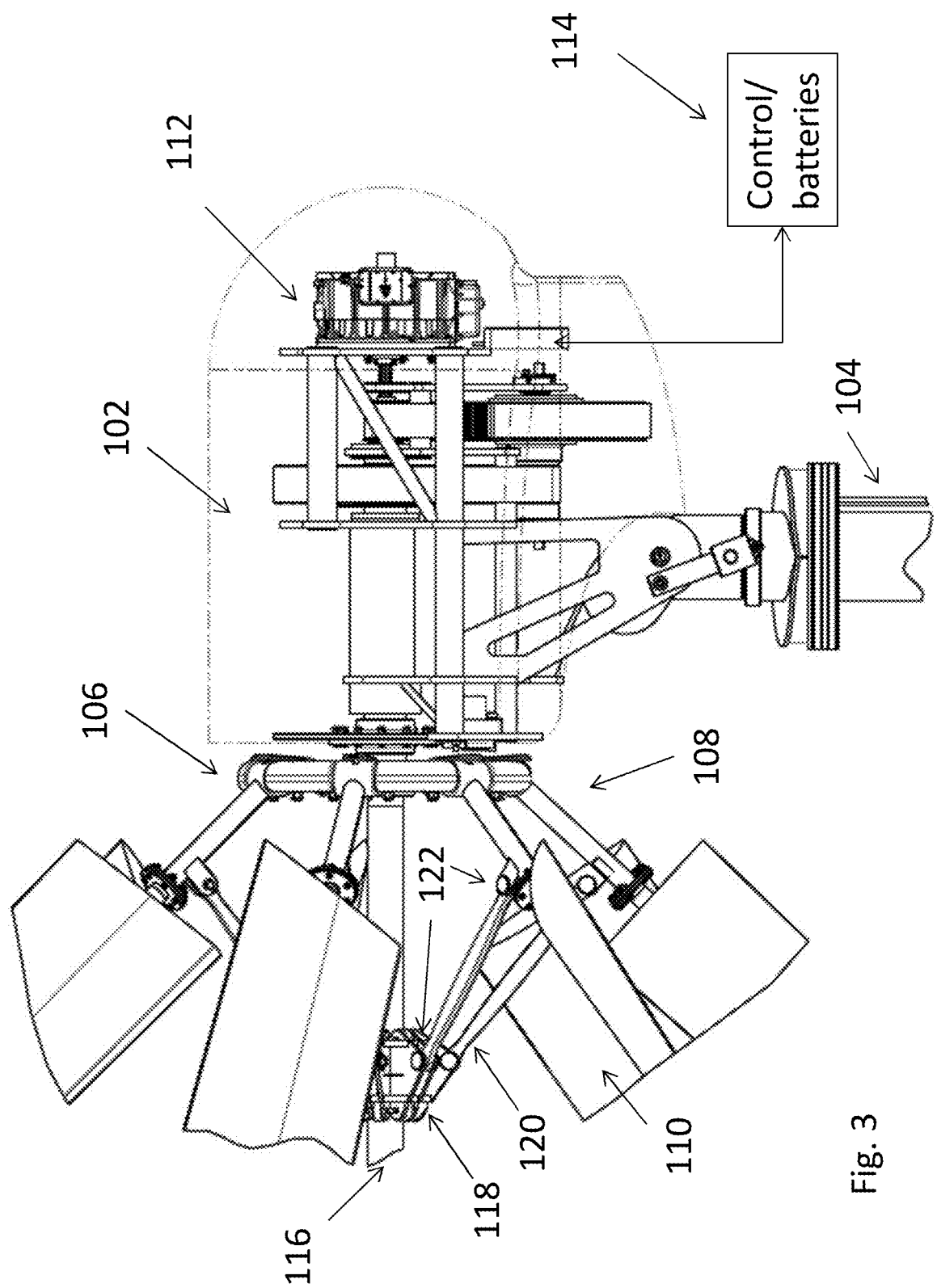
FIG. 3 illustrates a side view of an embodiment of the invention in a partially deployed position.
Figure 4:
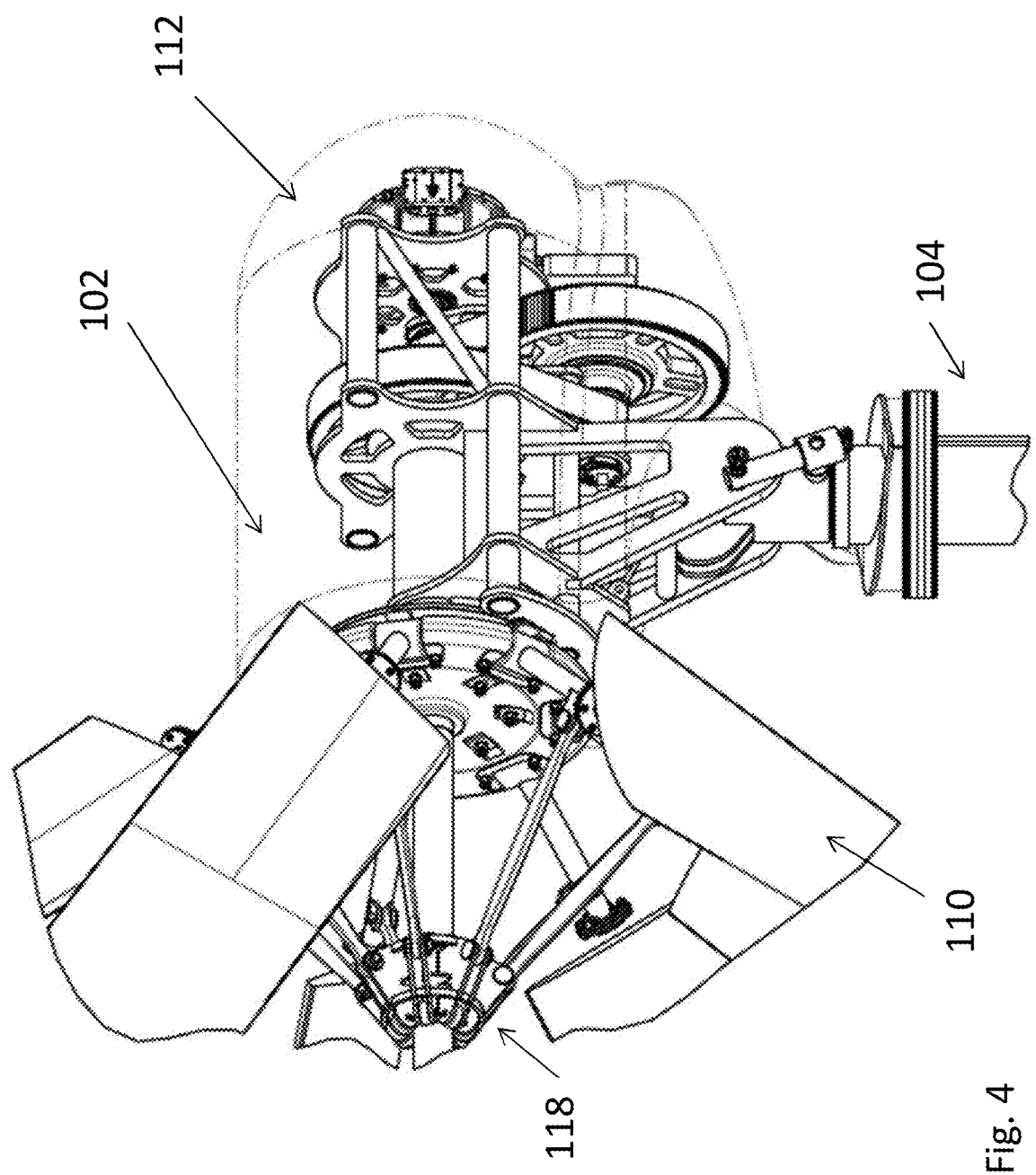
FIG. 4 illustrates a perspective view of an embodiment of the invention in a partially deployed position.
Figure 5:
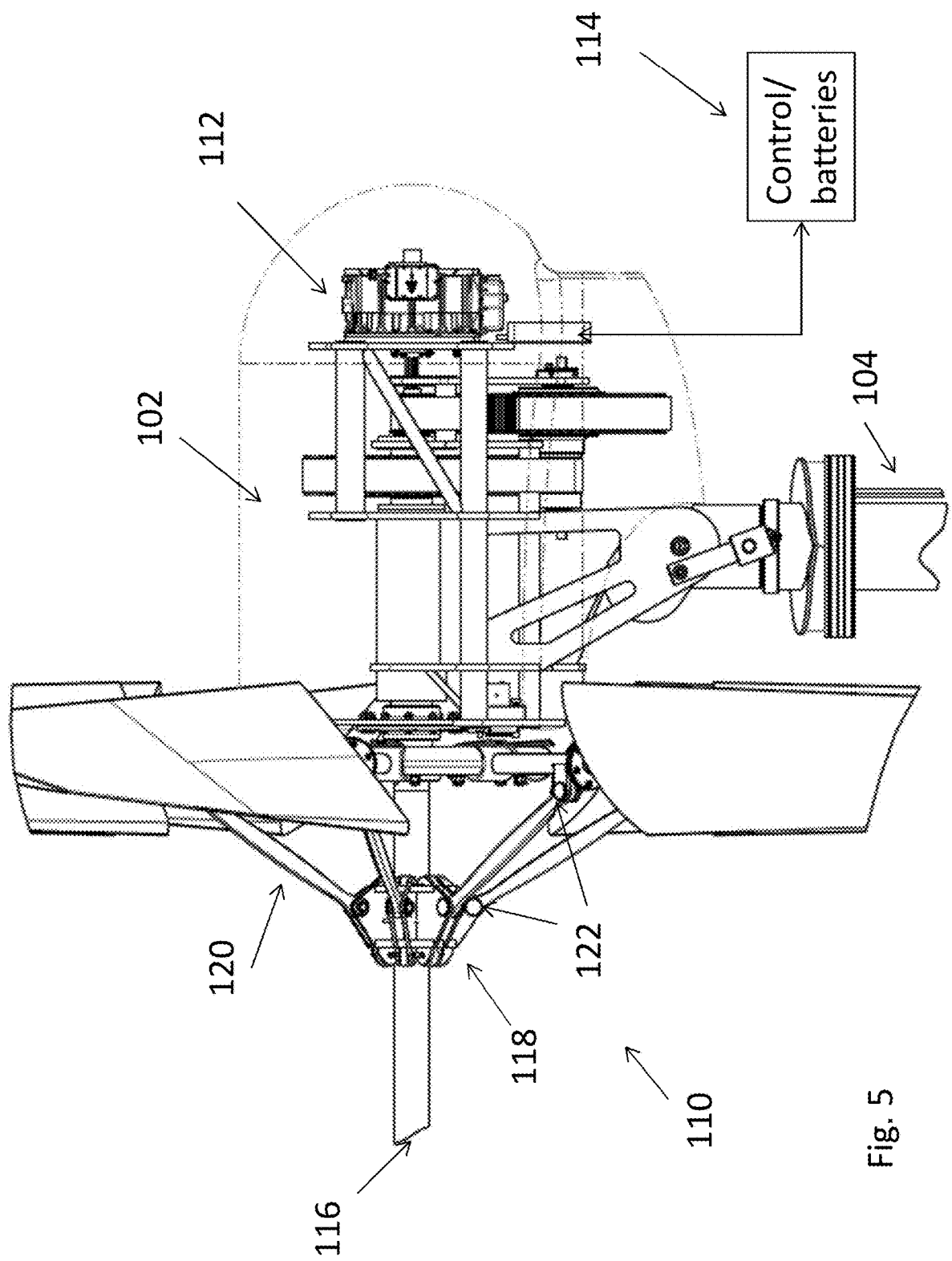
FIG. 5 illustrates a side view of an embodiment of the invention in an ideally fully deployed position.
Figure 6:
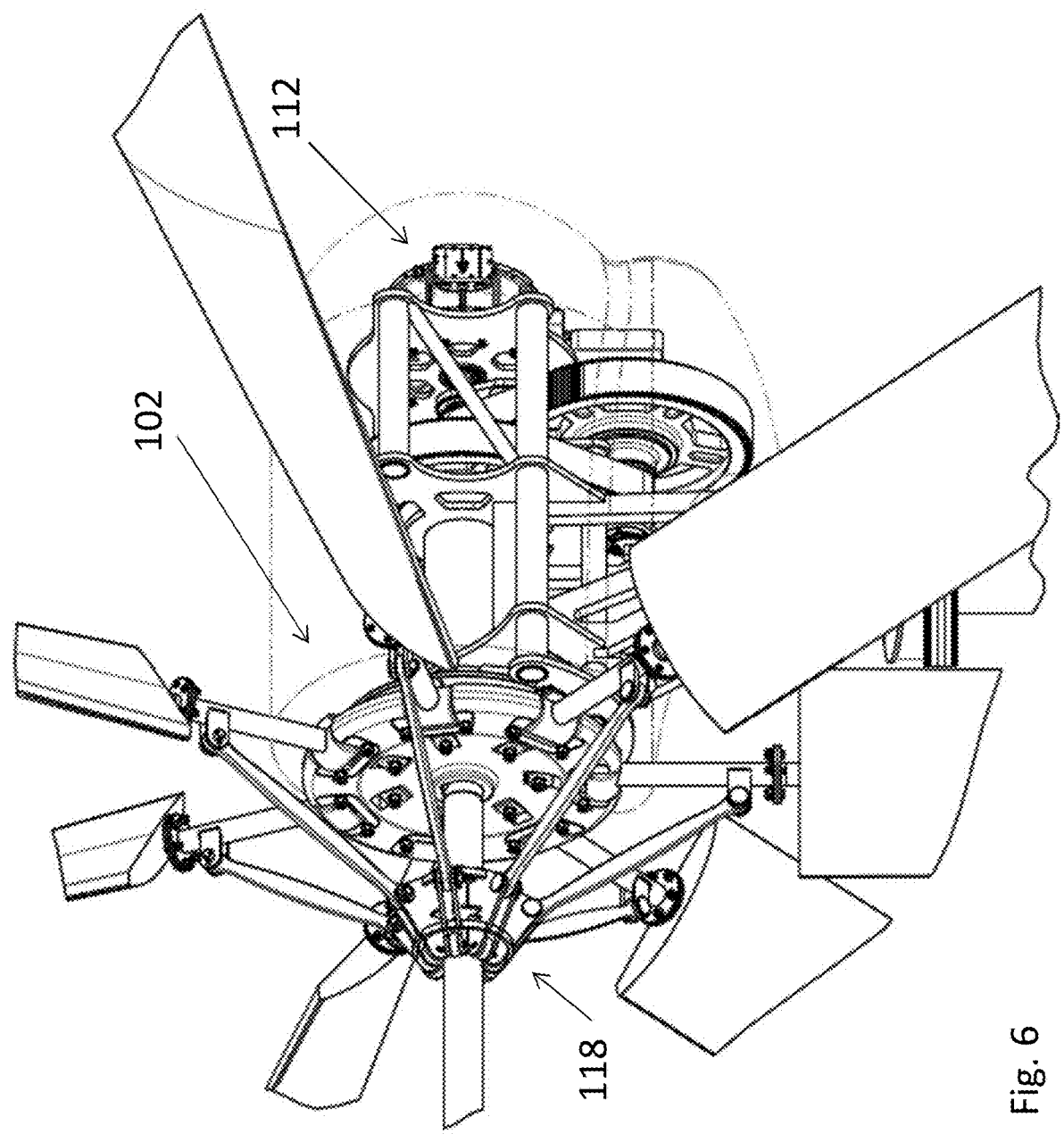
FIG. 6 illustrates a perspective view of an embodiment of the invention in an ideally fully deployed position.

FIGS. 3 and 4 show the components of FIGS. 1-2 in a partially deployed position, and reveal the presence of a support rod 116 and a sliding ring 118 mounted thereon. The shaft 108 of each blade 110 is pivotally connected to sliding ring 118 via brace 120 and pivot points 122. FIGS. 5 and 6 show the components of FIGS. 1-2 in an ideally fully deployed position.

Figure 7:
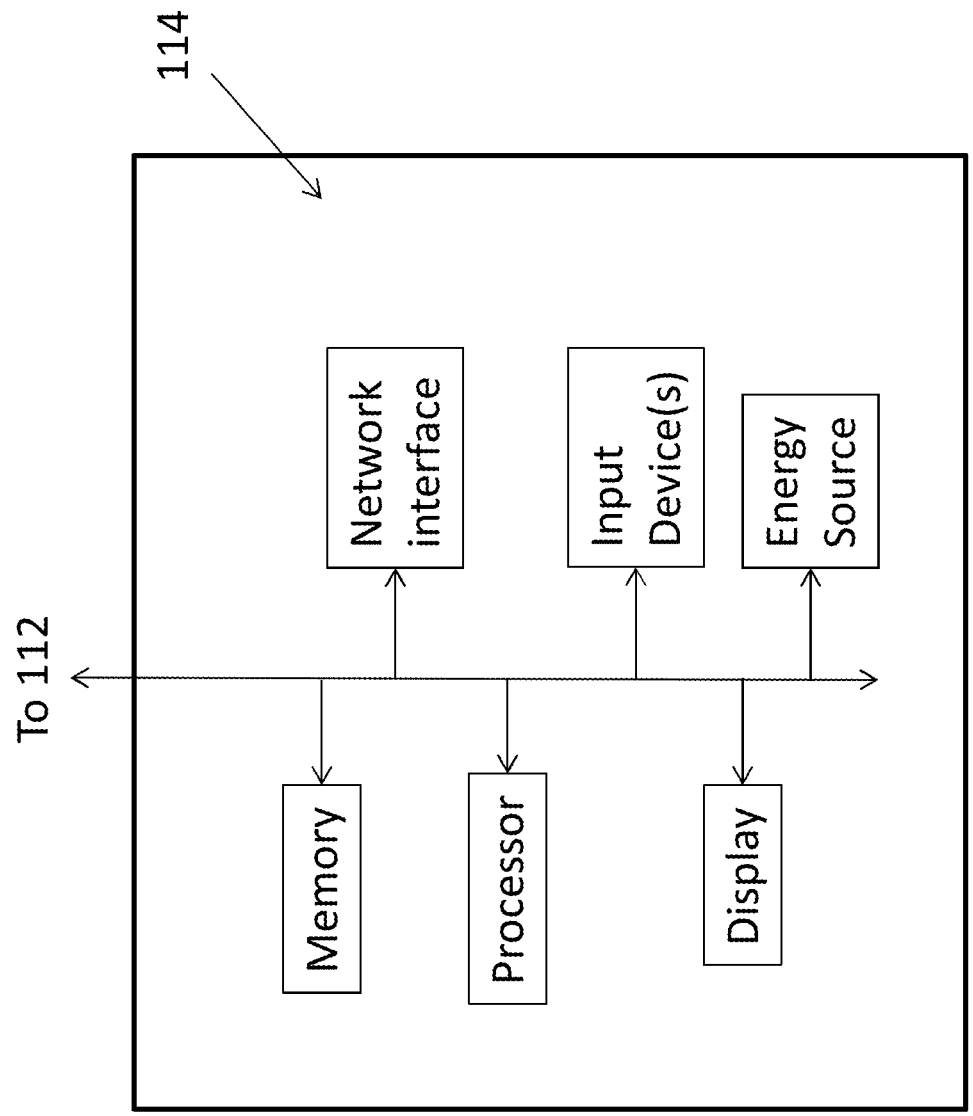
FIG. 7 illustrates a block diagram of a controller according to an embodiment of the inventions.

Referring now to FIG. 7, controller 114 controls the opening, closing and overall position of the blade deployment. The controller may be any software and/or hardware combination to effectuate the control of the torque forces exerted by the generator 112. To the extent computer control is present, then typical computer elements including memory, processor, etc., are present. An energy source via a battery or other source is provided to support controller 114 and/or provide the current flow to rotate blades 110. The control commands may be in the form of software resident on the computer, and as such stored in appropriate computer readable media such as hard drive or flash drive. The invention is not limited to any particular type of computer architecture and/or storage media, and the components and functionality of FIG. 7 can be bundled or distributed as appropriate.

To open the blades 110 from the retracted position, a reverse current is applied from batteries or other electrical source to the generator 112; preferably this current is applied gradually from zero to a predetermined value, although this need not be the case, and if gradual it need not be linear. The electrical input causes the generator 112 to act as a rotating motor to spin the entire assembly of blades 110 in the same direction as the wind would induce.

This spinning motion causes the blades 110 to move outward from their tips through the effect of the centrifugal force imparted by the spinning action. The blades 110 will thus move to a transitional intermediate position between the retracted and fully deployed position. This transition is shown generally by comparing FIGS. 1 and 3 and 2 and 4, respectively. FIGS. 3 and 4 show a generally 45 degree angle for the transitional intermediate position, but this is for illustration purposes only and does not limit the state of deployment of the blades 110 based on current flow.

As the blades 110 move outward from the retracted position, the surface area of the blades 110 relative to the wind increases. Since the blades 110 are designed to rotate about the axis in the presence of wind, incoming ambient wind will begin to exert a rotation force on the blades 110 as the wind moves over the blades 110; this rotational force increases as the blades 110 further deploy. While initially the influence of wind is negligible due to the small angle of deployment, at sufficient deployment angle the interaction of the wind will cause the blades 110 to rotate faster than the speed induced by the current. This increase in speed further enhances the centrifugal force effect to further deploy the blades 110 toward the fully deployed position in FIGS. 5 and 6. The wind will also physically bias the blades 110 back toward the retracted position, but in normal operation the opening effect of the centrifugal force is stronger than the closing effect of the direct wind; the collective forces from the wind net results in further deployment of the blades 110 to toward the fully deployed position.

This cycle continues with the blades 110 continuing to deploy, the increase in surface area during deployment captures more wind, the increase in wind capture further increases the rotational speed, the increase in rotational speed increase increases the centrifugal force, which causes further deployment. The cycle continues until the speed and centrifugal force reach a point that the blades 110 move into the fully deployed position.

In the initial transition from the retracted position to fully open position, the surface area of blades 110 presented to the wind is insufficient to induce sufficient rotation from the wind alone to deploy the blades 110. If the applied reverse current were removed or reduced in this initial phase, the blades 110 would either remain in their current state of deployment or retract back to the retracted position.

The deployment methodology above only requires enough reverse current for sufficient deployment of the blades 110 to reach a transition point in which the wind can on its own induce sufficient rotation in the blades 110 to continue the deployment process without contribution from the current flow. The system parameters consistent with this transition event may be a percentage of the maximum rotational speed, electrical output of the turbine, and/or deployed angle; other appropriate system parameters could also be used. Once this transition point is reached (or a point slightly beyond, as may be measured by a predetermined voltage, speed, percentage or the like), controller 114 begins to taper the application of reverse current back to zero while the force of the wind applies the necessary energy to continue the deployment. If for some reason the speed drops off (e.g., a drop in wind speed) before full deployment, the reverse current can be reengaged to reinitiate the deployment process. In the alternative, current can continue being applied during the entire deployment cycle.

The control methodology above thus initially relies upon rotation induced by reverse current to partially deploy the blades 110. This reverse current is preferably not sufficient to induce full deployment, such that without wind contribution the blades 110 will not reach the fully deployed position. Once the transition point is reached, the reverse current can be drawn down and generator 112 slowly begins to act as an electrical generator rather than a motor while the wind takes over deployment. If for any reason there is a backslide (e.g., a sudden drop in wind), then control can increase the reverse current to bring the generator 112 back to the preferred state for deployment.

Once the blades 110 reach the fully deployed position, they will tend to remain deployed absent controlled retraction. This is because the centrifugal force caused by rotation overcomes the tendency of the wind to force the blades 110 rearward. This balance maintains deployment regardless of wind speed within normal operating ranges.

As generator 112 extracts power from the rotational forces imparted by the wind turbine blades 110, they create a torque drag that allows the wind to push the blades 110 rearwards slightly from their fully deployed position into a slight coning configuration, which can be somewhat beneficial for the directional control of the turbine into the wind (and also to induce coning or partially open position to mitigate the effect of damaging winds and still allow partial operation). There is a balance point between the torque forces imparted by the generator 112 slowing rotation and the rearward forces of wind pressure on the blades 110 causing them to be pushed rearward into a partially deployed or coned position. In other words as the blades 110 speed up the generator 112 automatically through its basic nature imparts additional torque forces thus slowing the rotation of blades 110 slightly maintaining a partially deployed or coned position. And reversely as the wind speed slows slightly the rearward forces imparted by the wind on the blades 110 diminishes also allowing them to open more towards their vertical operating position. This activity can automatically create a desirable balance point for safe coned operation in strong potentially damaging winds. The controller 114 can also be utilized to augment this naturally occurring condition. This may account for some deviation in the fully deployed position from a perfect vertical, and this is referred to herein as generally vertical or generally perpendicular to the axis of rotation of the turbine.

It may on occasion be desirable to move the deployed blades 110 out of the fully deployed position into a partially deployed position or the retracted position. For example, winds may reach a point that they place undue stress on the system in full deployment. A partial retraction of the blades 110 will reduce the effect of the wind on the blades 110, and thus the overall stress of the system. This can be done by adding torque from the generator and/or a mechanical brake. In another example, the winds may reach a critical point that the blades 110 need to be closed for necessity. In yet another example, the blades 110 may need to be closed to effectuate relocation of the turbine or maintenance.

The methodology for moving the blades 110 from the fully deployed position to a partially deployed position or a retracted position depends on the presence of sufficient wind.

In the presence of sufficient wind, the blades 110 are typically in their fully deployed position and will remain so because the rotation induces a centrifugal force in favor of deployment that is stronger than the rearward wind pressure on the blades 110 in favor of retraction. This balance can be changed by applying a controlled brake via controller 114 to the rotation of the blades 110 induced by, e.g., the generator 112 adding excess torque or a failsafe mechanical brake. Slowing the rotation of blades 110 decreases the centrifugal forces holding the blades 110 in the fully deployed position. When the deployment influence of the centrifugal force falls below the direct reward pressure of the wind on the blades, the wind flow will begin to move blades 110 out of the fully deployed position.

As the blades 110 move out of the fully deployed position, the ambient wind provides less and less rotational force. If that imposed force drops below the decreased centrifugal force, a balance point is reached and defines a partially deployed position in which the blades 110 will settle and continue to rotate. However, if the centrifugal force is insufficient to maintain the blades 110 in any deployed position, they will move all of the way to the retracted position.

Braking can be initiated by a mechanical brake operating per the controller 114. In addition and/or the alternative, permanent magnet generators can act as brakes if the controllers causes the generators to extract significantly more electrical energy than they normally would use during normal operation. When this occurs, a braking action is applied to the rotating shaft and blade assembly by the generator 112.

Applied braking is preferably controlled to move the blades 110 as desired. For full closure, the blades 110 would simply be allowed to move, although preferably the constraint on rotation would only be sufficient to allow a slow transition (rather than an uncontrolled motion that could damage the architecture).

For partial closure, the application of the brake would be sufficient to reach the desired angle of deployment, and then regulated to keep the blades 110 in that position. In the alternative, one or more selectively physical stops or locks may be used to maintain a desired angle in such a case the brake can be released, but the stop physically prevents further deployment beyond the desired angle. Wind speed, rotation speed and/or other system sensors may be provided to monitor the state of deployment that allows the controller to react to the same. Angles of upwards of about 45 degree retraction may be possible, although the invention is not so limited.

In the absence of sufficient wind, the above retraction methodology will not be effective because there is insufficient wind force to induce the rearward motion of the blades 110. In these circumstances—in which the blades 110 will be either still or in light rotation—control applies a reverse current to the generator 112 to rotate the blades 110 in direction opposite to what the wind would normally induce. This creates a reverse force on the blades 110 that urges them toward the retracted position, and they will so move.

Figure 8:
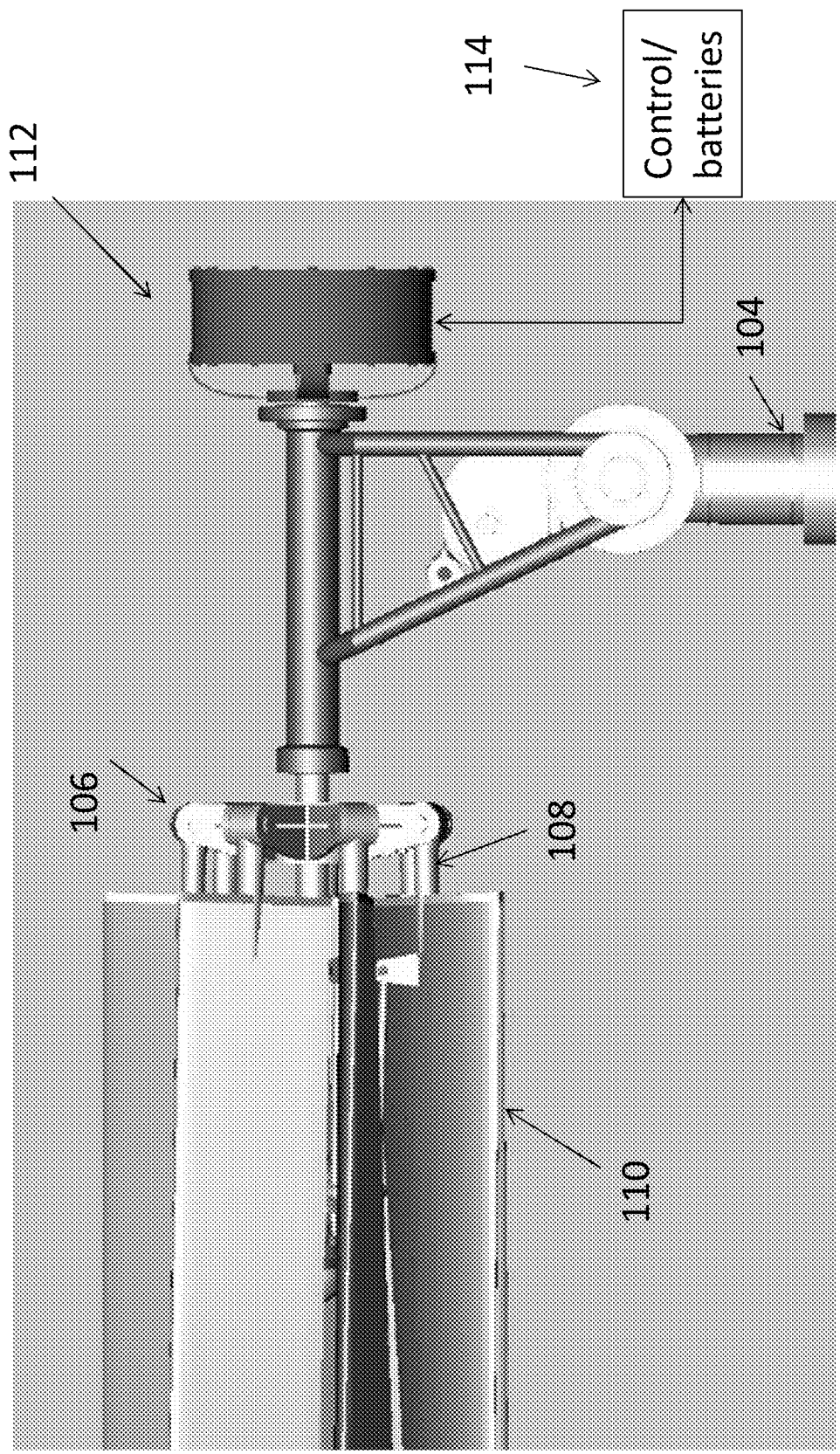
FIG. 8 illustrates a side view of another embodiment of the invention in a closed position.

FIGS. 8-10 show another embodiment of the invention, in which like numerals represent like elements. This embodiment shows that nacelle 102 can be omitted in favor of support components. A stop 124 can also be provided on rod 116 to prevent further movement of sliding ring 118. Stop 124 may also include a locking component such as described herein to hold the blades 110 in the retracted position.

Computing elements described herein can be performed in other general purpose or specialized computing devices, such as personal computers, desktop or laptop computers, or mainframe computers, as well as cellular, wireless, and handheld devices running mobile software and capable of supporting a number of networking and messaging protocols. There may any number of workstations running any of a variety of commercially-available operating systems and other known applications. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, SFTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments where the computing device includes a server, the server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A wind turbine, comprising:
   a support having an axis of rotation;
   a generator;
   a plurality of blades rotatably mounted on the support about the axis of rotation, the blades being moveable between a retracted position generally parallel with the axis of rotation and a fully deployed position generally perpendicular with the axis of rotation;

the blades being connected to the generator such that rotation of the blades in a direction induced by wind causes the generator to produce electricity, and provision of electricity to the generator rotates the blades;

a controller storing a blade opening protocol for the wind turbine to deliver a flow of current to the generator that is sufficient to move the blades from the retracted position toward the fully deployed position and insufficient to move the blades all the way to the fully deployed position;

wherein the flow of current induces rotation of the blades in the direction induced by wind, which creates a centrifugal force that moves the blades from the retracted position toward the fully deployed position;

wherein, as the blades move from the retracted position, the blades have increasing exposure to ambient wind to receive additional rotational force from ambient wind, and the additional rotational force being sufficient to, either alone or in combination with the flow of current, move the blades into the fully deployed position.

2. The turbine of claim 1, wherein based on ambient wind speed a transitional intermediate position of partial deployment exists between the retracted position and the fully deployed position, and at the transitional intermediate position the ambient wind contributes sufficient rotational force on the blades to move the blades into the fully deployed position.

3. The turbine of claim 2, wherein the controller reduces the flow of the current after the blades move from the retracted position to the transitional intermediate position.

4. The turbine of claim 2, wherein the controller is configured to identify the transitional intermediate position based on when a rotating speed of the blades exceeds what is induced by the flow of the current.

5. The turbine of claim 4, wherein the controller reduces the flow of the current after the blades move from the retracted position to the transitional intermediate position.

6. The turbine of claim 1, wherein said controller is configured to move the blades out of the fully deployed position by slowing the rotation of the blades, such that force from ambient wind that biases the blades toward the retracted position overcomes the centrifugal force of the rotating blades that biases the blades toward the fully deployed position.

7. The turbine of claim 1, further comprising:
a first retraction protocol stored in a memory to move the blades into the retracted position, the first retraction protocol being a slowing of the rotation of the blades.

8. The turbine of claim 1, further comprising the controller being configured to move the blades from the fully deployed position to a partially deployed position and to maintain the partially deployed position by slowing the rotation of the blades.

9. The turbine of claim 1, wherein the blades self-adjust to a partially deployed position that balances effects of at least weight of the blades, the centrifugal force of the blades when rotating, torque factors imparted by the generator, and energy imparted on the blades by engaging wind.

10. The turbine of claim 1, further comprising:
a support hub rotatably mounted relative to the axis of rotation;
each of the blades being pivotally mounted to the support hub;
a support rod coaxial with the axis of rotation;
a sliding ring mounted on the support rod; and
a plurality of braces, each pivotally connecting one of the blades to the sliding ring;
wherein the sliding ring moves toward and away from the support hub as the blades open and close, respectively.

11. A method for deploying a wind turbine, comprising:
providing the wind turbine, the wind turbine comprising:
a support having an axis of rotation;
a generator;
a plurality of blades rotatably mounted on the support about the axis of rotation, the blades being moveable between a retracted position generally parallel with the axis of rotation and a fully deployed position generally perpendicular with the axis of rotation;
the blades being connected to the generator such that rotation of the blades in a direction induced by wind causes the generator to produce electricity, and provision of electricity to the generator rotates the blades;
delivering a flow of current to the generator that is sufficient to move the blades from the retracted position toward the fully deployed position and insufficient to move the blades all the way to the fully deployed position;
wherein the flow of current induces rotation of the blades in the direction induced by wind, which creates a centrifugal force that moves the blades from the retracted position toward the fully deployed position;
wherein, as the blades move from the retracted position, the blades have increasing exposure to ambient wind to receive additional rotational force from ambient wind, and the additional rotational force being sufficient to, either alone or in combination with the flow of current, move the blades into the fully deployed position.

12. The method of claim 11, wherein based on ambient wind speed a transitional intermediate position of partial deployment exists between the retracted position and the fully deployed position, and at the transitional intermediate position the ambient wind contributes sufficient rotational force on the blades to move the blades into the fully deployed position.

13. The method of claim 12, further comprising reducing the flow of the current after the blades move from the retracted position to the transitional intermediate position.

14. The method of claim 13, further comprising identifying when to commence the reducing the current based on when a rotating speed of the blades exceeds what is induced by the flow of the current.

15. The method of claim 14, further comprising reducing the flow of the current after the blades move from the retracted position to the transitional intermediate position.

16. The method of claim 11, further comprising moving the blades out of the fully deployed position by slowing the rotation of the blades, such that force from ambient wind that biases the blades toward the retracted position overcomes the centrifugal force of the rotating blades that biases the blades toward the fully deployed position.

17. The method of claim 11, further comprising:
moving the blades into the retracted position by slowing rotation of the blades.

18. The method of claim 11, further comprising: moving the blades from the fully deployed position to a partially deployed position; and
maintaining the partially deployed position by slowing the rotation of the blades.

19. The method of claim 11, wherein the blades self-adjust to a partially deployed position that balances effects of at least weight of the blades, the centrifugal force of the blades when rotating, torque factors imparted by the generator and energy imparted on the blades by engaging wind.

* * * * *